Jan. 12, 1937.  M. F. McCOMBS ET AL  2,067,720
APPARATUS FOR SUPPLYING CHLORINE
Filed Sept. 5, 1935
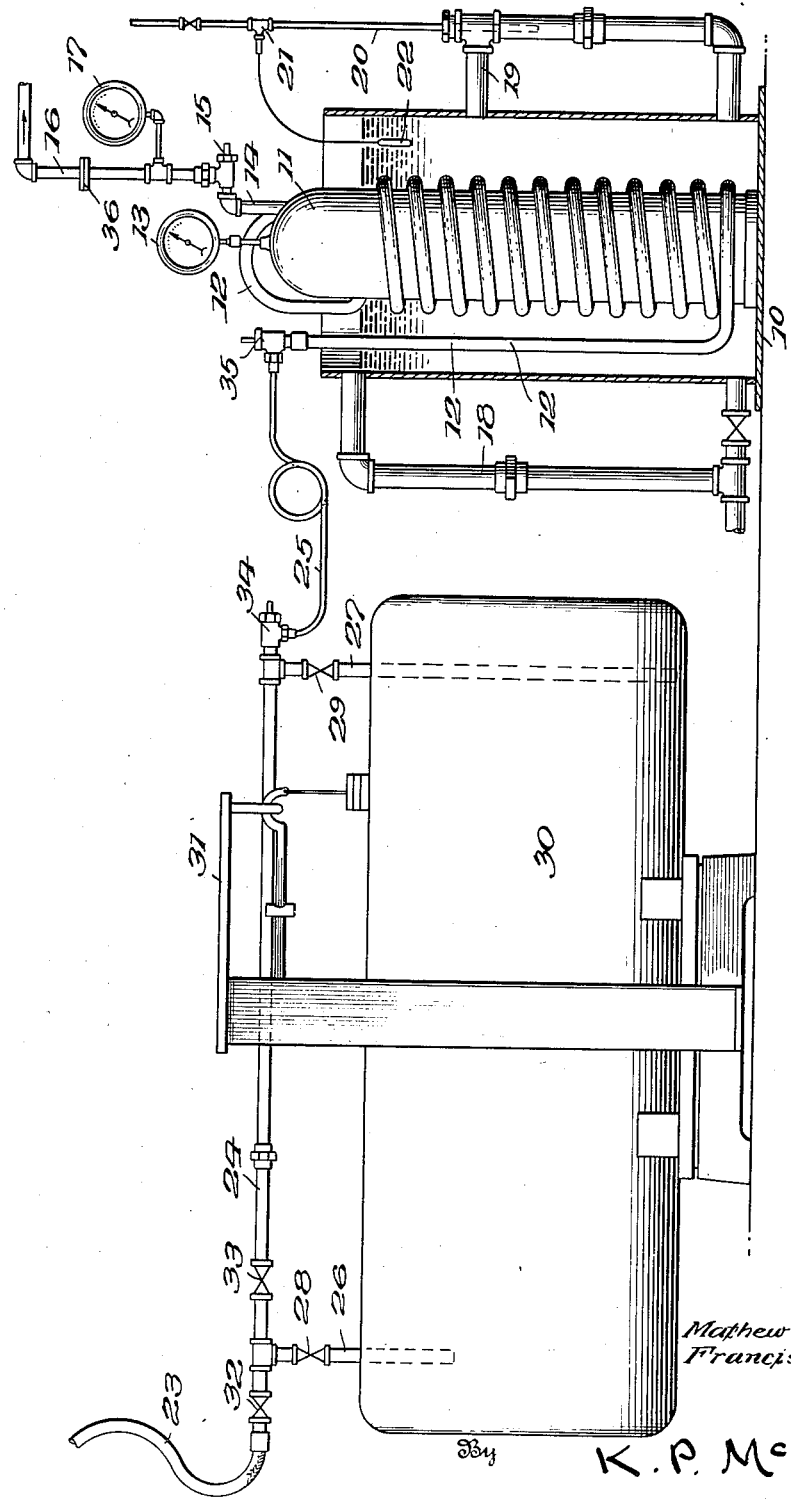
Inventors
Mathew F. McCombs
Francis W. Decker
By K. P. McElroy
Attorney Patented Jan. 12, 1937

2,067,720

UNITED STATES PATENT OFFICE 2,067,720

APPARATUS FOR SUPPLYING CHLORINE

Mathew F. McCombs and Francis W. Decker, Niagara Falls, N. Y., assignors to Niagara Alkali Company, Niagara Falls, N. Y., a corporation of New York Application September 5, 1935, Serial No. 39,354

6 Claims. (Cl. 62—1)

This invention relates to apparatus for supplying chlorine, and it comprises apparatus supplying chlorine in uniform and continuous flow in pulp bleaching and like operations; said apparatus comprising a flash evaporator for liquid chlorine in direct communication with a tank car or other source of bulk supply, with an auxiliary chlorine receiver as a reserve supply connected in parallel to the line between the tank car and evaporator from which the liquid chlorine is supplied to the evaporator, functioning when one tank car has been emptied and is being replaced by another, with valve means normally closed at other times to permit direct flow of liquid chlorine from the tank car to the evaporator, said auxiliary receiver being mounted on a weighing scale so that consumption of chlorine therefrom may be computed from the variations in its indicated weight; and the invention further comprises a flash evaporator immersed in a bath of water with means for automatically regulating the temperature of the water, a manually regulable valve for controlling the flow of chlorine gas from said evaporator, and gage means in the line from the evaporator for indicating the flow of gas to the chlorination process; all as more fully hereinafter set forth and as claimed.

In chlorinating processes it is desirable to maintain a constant and continuous flow of gaseous chlorine with accurate quantitative control. Any continuous process requires a constant flow to secure uniform results. Chlorine is ordinarily supplied from a bulk supply, such as a tank car with the chlorine in liquid condition. When one tank car is emptied another is shifted into position to replenish the supply. Shifting over requires an appreciable time and interrupts the chlorinating process until the new supply is available. The present invention overcomes this difficulty by providing an auxiliary tank connected in parallel to the main line from the tank to the point of use; this auxiliary supply being kept filled with liquid chlorine. During the regular flow of chlorine from the tank to the point of use the auxiliary tank is closed off, holding its contents in reserve. The auxiliary tank rests upon a beam scale so that the rate of chlorine withdrawal therefrom can be computed by noting the loss of weight as indicated by the scale when the auxiliary tank is serving as the source of supply. These computations may be used as a check on the readings of the gage at the outlet of the apparatus.

The invention, further, includes a flash evaporator which is normally in open communication with the source of bulk supply and consequently is under the same pressure, the evaporator being mounted in a surrounding container filled with water which is maintained at a desirable temperature, about 170° F, by the thermostatic control of steam injected into the bath. When liquid chlorine volatilizes, producing gaseous chlorine, there is a drop in temperature and the warm water surrounding the flash evaporator supplies the necessary heat units.

An object which is achieved by our invention is the provision of a continuous supply of chlorine to a process in a constant and regulated flow, by the employment of an auxiliary chlorine supply to be used when the bulk supply from the tank car is exhausted, and replenished by the supply from a full tank car at the same time that flow from such replenished bulk supply is re-established.

Another object is to provide a flash evaporator for liquid chlorine which includes a water bath automatically maintained at a desired temperature for furnishing heat in the passage of the chlorine from liquid to gas, and a receiver from which the gas is drawn in measured flow and is conducted to the process.

Another object is to prevent excessive pressures in the flash evaporator by maintaining open communication between it and the tank car supply so that the generation of higher pressure in the evaporator than in the storage tank will cause the liquid chlorine to back up in the communicating piping between the two until a balanced condition of pressure is reached.

Another object is to regulate the feed of liquid chlorine into the flash evaporator in relation to the withdrawal of chlorine gas therefrom, by the back pressure of gas contained in the evaporator exerted upon the incoming liquid.

Still another object is to provide a gage in the gas line beyond the outlet valve of the evaporator, and weighing means for the auxiliary supply tank, so that by noting variations in the weight of the auxiliary tank as it is emptied, the flow of chlorine can be computed to check the accuracy of such gage.

Other and further objects will be apparent from the following description and drawing wherein the single figure is a side elevation, partly in section, of a chlorinating apparatus embodying the features of our invention.

Referring more particularly to the drawing, the flash evaporator comprises a tank or receptacle 10 within which is mounted a gas receiver 11, the inlet pipe 12 of which is coiled about the receiver a number of times in order to afford an extended heat exchanging surface, so that the liquid chlorine passing through the pipe 12 into the receiver may absorb the heat of water which fills the receptacle 10 and thus be more readily converted into gas.

A gage 13 is responsive to pressures within the receiver and, as will be later described, consequently registers the pressure of chlorine in the tank car or other source of supply. An outlet pipe 14 also communicates with the receiver 11 and has a needle valve 15 by regulation of which a flow of gaseous chlorine can be controlled. In the outlet pipe 16 beyond valve 15 there is a gage 17 which can be calibrated to read in pounds of chlorine per unit of time, or a factor can be used to convert pounds pressure into pounds chlorine per unit of time. A fitting 36 embodying a restricted orifice is interposed between gage 17 and outlet pipe 16, as shown. With this arrangement the flow of chlorine can be read on the gage over a very wide range, by regulating needle valve 15. The size of the orifice in fitting 36 is selected according to the (maximum) chlorine requirements of the particular process with which the apparatus is employed. An overflow pipe 18 communicates with the receptacle 10 near its open upper end to maintain the level of water in the receptacle, and branch piping 19 constituting a water leg also communicates with the receptacle. The water is circulated through this leg and consequently through the receptacle 10 to maintain it at an even temperature throughout by steam injected from an eduction pipe 20 which enters the vertical portion of the leg and constitutes a steam jet impeller. The supply of steam is regulated by a valve 21 which is controlled by a thermostat 22 immersed in the water bath. Thus, the water bath is heated to a desired temperature, say 170° F., and liquid chlorine flowing through piping 12 in heat exchanging relation with the hot water of the bath, and subsequently into the receiver 11, absorbs the necessary heat to convert it to a gas in the receiver.

From a tank car, not shown, the conventional goose neck piping 23 communicates through pipes 24 and 25 with pipe 12 of the evaporator whereupon a direct flow of liquid chlorine between the two can be established. The pipe 24 has communicating branch pipes 26 and 27 which are provided with valves 28 and 29 respectively, and which extend into an auxiliary tank 30 shown as simply exposed to the atmosphere, and supported upon a beam scale 31. A valve 32 in the pipe 24 serves to cut off the source of bulk supply when it is necessary to replenish it and when the supply in auxiliary tank is to be used. Valve 33 in the pipe 24 may be closed when it is desired to replenish the supply of liquid chlorine in the auxiliary tank 30 as by opening the valves 32 and 28 and closing valve 33, liquid chlorine in the meantime being supplied to the flash evaporator through pipe 27 from tank 30. A valve 34 also in the line 24, and a valve 35 may additionally control the flow of chlorine to the evaporator.

In operation of the apparatus, the receptacle 10 is filled with water and steam is turned on by valve 21, passing through the injector pipe 20 into the water to circulate and heat it. In this circulation water is drawn from the top of the water bath and forced to the bottom through the water leg by the force of the issuing steam jet. This provides the necessary circulation of water for uniform temperatures throughout the bath and also for rapid heat transfer. The thermostat having been set for a predetermined temperature of approximately 170° F. will close valve 21 when this temperature of the bath is reached. Thereupon liquid chlorine is permitted to flow from the tank car or other bulk container when valves 32, 33, 34 and 35 are opened in the order named, valves 28 and 29 being closed to cut off the auxiliary tank.

After about five minutes liquid chlorine in the evaporator will have changed from liquid to gas by absorption of heat from the water bath. The needle valve 15 is thereupon gradually opened until the pressure gage 17 registers the desired pressure on the outlet pipe 16. The valve 15 may be regulated to increase or decrease the flow of chlorine at the outlet according to the requirements of the chlorination process in which it is used.

Gage 13 which communicates with the receiver 11 will show the pressure on the storage tank or tank car since all the valves in the line between it and the tank car are open. If, in the evaporation of chlorine, a higher pressure should be generated in the receiver 11 than on the storage tank the liquid chlorine in the communicating piping will back up into the storage tank so that the pressure balance will be restored. Furthermore, the gas in the receiver 11 will hold back the flow of liquid chlorine into the flash evaporator and allow only enough of the liquid chlorine to enter to compensate for that which is withdrawn from the receiver past the valve 15.

The water bath remains at a constant temperature, and consequently the evaporated chlorine gas has a uniform temperature. It is therefore possible to maintain a continuous flow of gas by regulation of the valve 15.

It is especially desirable to maintain a continuous and constant flow of chlorine in order that the chlorination process need not be stopped in changing tank cars. To this end, our invention includes an auxiliary storage tank 30 as previously described. This tank, such as a chlorine ton drum, is connected between the tank car and evaporator. To fill the auxiliary tank while the inlet and outlet valves of the evaporator are open the valves 28 and 29 are manipulated to establish communication with pipe 24 and the goose neck 23, and valve 33 is closed. The liquid chlorine thereupon flows from the source of supply through the goose neck 23 and pipe 26 into the auxiliary tank 30 while at the same time sufficient liquid chlorine for the process is drawn from the auxiliary tank through pipe 27 into the connected piping 25 and 12. When the auxiliary tank has been filled to the desired level the valve 32 is closed and chlorine may thereupon be withdrawn from the auxiliary tank while the emptied tank car is shifted away and replaced by a new one whereupon the valves 28 and 29 are closed and valve 32 again opened to establish the direct flow of chlorine from the tank car to the flash evaporator.

If it is desired to maintain the flow of chlorine per unit of time through the outlet orifice of the evaporator at any desired pressure on the gage 17, valves 32, 28 and 33 are closed and valve 29 is opened, whereupon liquid chlorine will be drawn from the drum 30 and the amount so drawn per unit of time may be checked by noting the loss of weight of the drum on the scale.

From the foregoing it will be apparent that our invention provides for the continuous conversion of liquid chlorine to gas and the maintenance of an uninterrupted supply of chlorine to a chlorinating process, whereby when the tank car or other source of bulk supply is emptied an auxiliary tank, which is normally maintained full by the tank car supply, may be cut in to furnish the chlorine required for continuous operation until a full tank car has been shifted into position to continue the supply of chlorine from a bulk source.

What we claim is:—

1. Apparatus for providing constant and regulated flow of gaseous chlorine from a source of liquid chlorine in a chlorinating process, said apparatus comprising a tank for supplying liquid chlorine, a flash evaporator to which the chlorine is delivered, a water bath in which said evaporator is immersed, means for heating the water of said bath, thermostatic means for controlling the heating means, thereby to regulate the temperature of said bath, and a valve in the outlet of said evaporator for controlling the flow of gaseous chlorine therefrom.

2. Apparatus for providing constant and regulated flow of chlorine to a process which utilizes it, comprising a tank for supplying liquid chlorine, a pipe therefrom extending into a water filled receptacle and terminating in an enlarged receiver for the collection of gaseous chlorine, means for injecting steam into the water in said receptacle to heat and circulate it, a valve for controlling the supply of steam thereto, a thermostat responsive to changes in temperature of the water in said receptacle for actuating said valve, piping extending from said enlarged receiver to a point of use and a valve in said piping for regulating the flow of gas to the process in which it is used.

3. A flash evaporator for liquid chlorine comprising a receptacle for water, means for heating the water, a receiver for chlorine within said receptacle, piping from a source of liquid chlorine supply to said receiver and arranged to subject the chlorine flowing therethrough to the temperature of the water in said receptacle thereby to raise the temperature of the chlorine before it flows into said receiver, and a valve controlled outlet from said receiver for regulating the flow of gas therefrom.

4. A flash evaporator for liquid chlorine comprising a receptacle for water, piping constituting a water leg extending from said receptacle, a steam supply pipe communicating with the water leg for injecting steam thereinto to heat and circulate the water in said receptacle, a chlorine receiver constituting a chamber immersed in the water in said receptacle, piping from a source of chlorine supply to said chamber, said piping being coiled about the chlorine receiver to expose the chlorine flowing therethrough to heat exchanging contact with the water in said receptacle, a thermostat responsive to temperature changes of the water in the receptacle, a steam supply valve in the aforesaid steam supply pipe and actuated by said thermostat for maintaining the water at a desired temperature, an outlet from said chlorine receiver, and a manually regulable valve for permitting gaseous chlorine to flow therefrom according to the requirements of the process in which it is to be used.

5. Apparatus for providing constant and regulated flow of gaseous chlorine from a source of liquid chlorine in a chlorinating process, said apparatus comprising a tank for supplying liquid chlorine, a flash evaporator to which the chlorine is delivered, means for maintaining the evaporator at substantially constant temperature, an outlet conduit from the evaporator leading to the point of use, a valve in the conduit for controlling flow of gaseous chlorine therefrom, a restricted orifice member in the conduit beyond the valve and a pressure gage between the valve and the orifice member.

6. Apparatus for providing constant and regulated flow of gaseous chlorine in a chlorinating process, from a bulk supply of liquid chlorine, said apparatus comprising a valved conduit adapted to be put in communication with the bulk supply, means normally in communication with said conduit for vaporizing the liquid chlorine and controlling the flow of chlorine gas, a container for holding an auxiliary supply of chlorine, means for determining the amount of chlorine in said container at any time, and means for putting the container into communication with said bulk supply to fill the container, and for putting the container into communication with the vaporizing and controlling means, so that chlorine may be drawn from the auxiliary container into the vaporizing and controlling means when desired.

MATHEW F. McCOMBS.
FRANCIS W. DECKER.